(12) United States Patent
Tiede et al.

(10) Patent No.: US 11,572,111 B2
(45) Date of Patent: Feb. 7, 2023

(54) TRACK-MODULE APPARATUS

(71) Applicant: ATI, Inc., Mt. Vernon, IN (US)

(72) Inventors: Duane Tiede, Naperville, IL (US); Jamsheed Reshad, Newburgh, IN (US); Jacob Adam, Floyds Knobs, IN (US); Timothy D. Stacy, Mt. Vernon, IN (US)

(73) Assignee: ATI, Inc., Mt. Vernon, IN (US)

( * ) Notice: Subject to any disclaimer, the term of this patent is extended or adjusted under 35 U.S.C. 154(b) by 798 days.

(21) Appl. No.: 16/590,613

(22) Filed: Oct. 2, 2019

(65) Prior Publication Data
US 2021/0101650 A1    Apr. 8, 2021

(51) Int. Cl.
*B62D 55/084* (2006.01)
*B62D 55/10* (2006.01)
(Continued)

(52) U.S. Cl.
CPC ........... *B62D 55/084* (2013.01); *B62D 55/10* (2013.01); *B62D 55/112* (2013.01);
(Continued)

(58) Field of Classification Search
CPC ...... B62D 55/084; B62D 55/04; B62D 55/10; B62D 55/14; B62D 55/15; B62D 55/112;
(Continued)

(56) References Cited

U.S. PATENT DOCUMENTS 3,168,929 A * 2/1965 Wardle .................. E02F 3/64
                                              180/9.1
3,841,424 A * 10/1974 Purcell ............... B62D 55/1086
                                              180/9.5
(Continued)

FOREIGN PATENT DOCUMENTS

EP           0052417       *  5/1982   ............ B62D 55/10

*Primary Examiner* — Anne Marie M Boehler
(74) *Attorney, Agent, or Firm* — Rickard DeMille; Rebecca Henkel

(57) ABSTRACT

A track-module apparatus comprising: (a) idler-arm axle structure for a vehicle and having leading and trailing idler-arm axles; (b) a leading idler arm rotatably attached to the leading idler-arm axle and extending forwardly to a leading-arm distal end at which a leading ground-engaging idler wheel is rotatably attached and rearwardly to a rearward suspension end; (c) a trailing idler arm rotatably attached to the trailing idler-arm axle and extending rearwardly to a trailing-arm distal end at which a trailing ground-engaging idler wheel is rotatably attached and forwardly to a forward suspension end; (d) bogie-axle structure (i) affixed to one of the idler arms, (ii) having at least one bogie-arm axle, and (iii) positioning the at least one bogie-arm axle adjacent to and below the idler-arm axle of the idler arm to which it is affixed; (e) leading-arm and trailing-arm suspension elements rotatably attached to and extending downwardly from the rearward and forward suspension ends, respectively, and each having a lower end; (f) front and rear bogie connecting arms rotatably attached to the front and rear axles, respectively, and extending forwardly and rearwardly to rotatable attachments at the leading-arm and trailing-arm suspension-element lower ends, respectively; (g) front and rear ground-engaging bogie-wheel sets rotatably attached to distal ends of the front and rear bogie connecting arms, respectively; and (h) an endless track extending around the wheels.

29 Claims, 12 Drawing Sheets

(51) Int. Cl.
*B62D 55/112* (2006.01)
*B62D 55/15* (2006.01)
*B62D 55/116* (2006.01)
*B62D 55/30* (2006.01)

(52) U.S. Cl.
CPC .......... *B62D 55/305* (2013.01); *B62D 55/116* (2013.01); *B62D 55/15* (2013.01)

(58) Field of Classification Search
CPC .... B62D 55/116; B62D 55/30; B62D 55/305; B62D 51/007
USPC ...... 180/9.21, 9.22; 305/130, 131, 132, 134, 305/135
See application file for complete search history.

(56) References Cited

U.S. PATENT DOCUMENTS

| | | | | |
|---|---|---|---|---|
| 5,452,949 | A * | 9/1995 | Kelderman | B62D 49/0635 305/129 |
| 7,628,235 | B2 * | 12/2009 | Satzler | B62D 55/30 180/9.1 |
| 9,415,818 | B1 * | 8/2016 | Tiede | B62D 55/10 |
| 2013/0154345 | A1 * | 6/2013 | Schulz | B62D 55/14 305/129 |
| 2014/0125118 | A1 * | 5/2014 | Nagorcka | B62D 55/104 305/132 |
| 2017/0129557 | A1 * | 5/2017 | Gustafson | B62D 55/104 |
| 2017/0225727 | A1 * | 8/2017 | Sauvageau | B62D 55/305 |
| 2018/0170464 | A1 * | 6/2018 | De Brouwer | B62D 55/244 |
| 2019/0135356 | A1 * | 5/2019 | Obermeier-Hartmann | B62D 55/1125 |

* cited by examiner

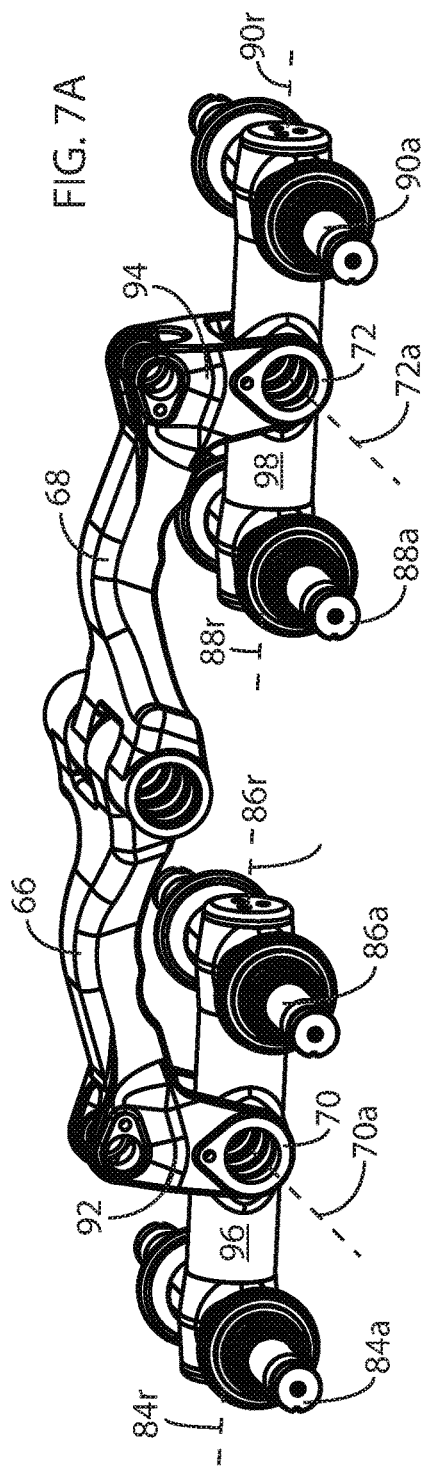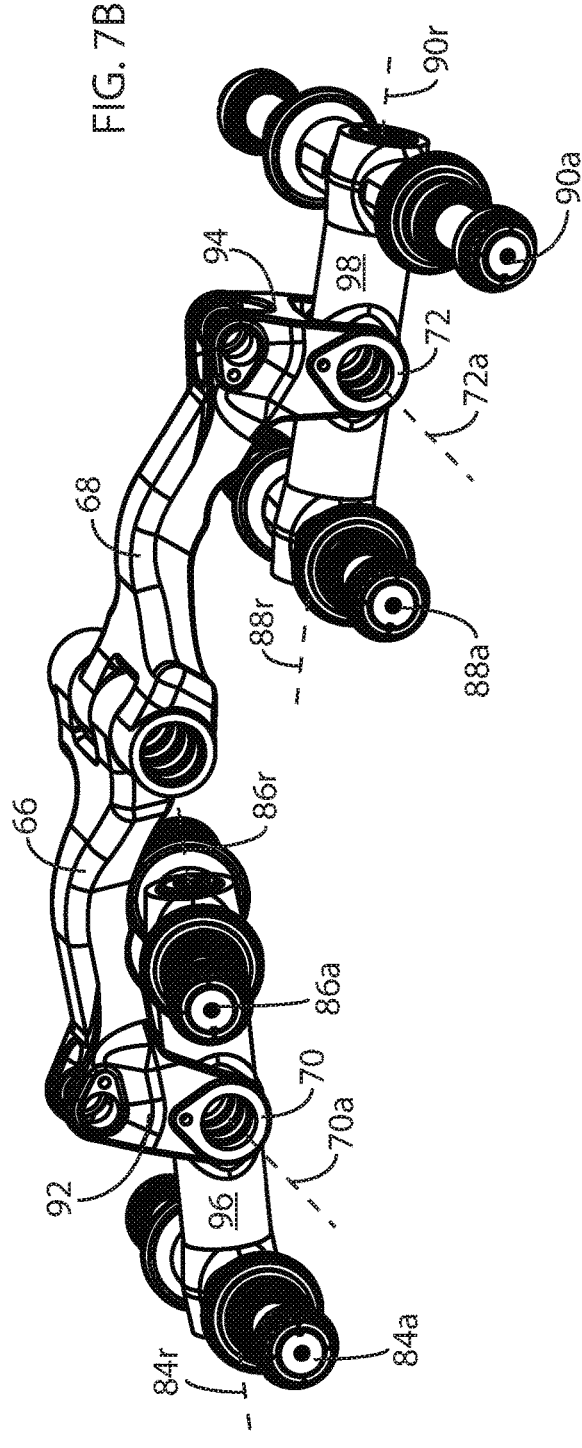

| Linkage Dimensions | |
| --- | --- |
| Linkage | Inches |
| H 12m:28 | 65.75 |
| H 12m:84 | 33.95 |
| H 12m:86 | 14.95 |
| H 12m:88 | 8.45 |
| H 12m:90 | 27.95 |
| H 12m:46 | 62 |
| H 12m:76 | 3 |
| H 12m:78 | 3 |
| H 12m:30 | 14.53 |
| H 12m:34 | 20.53 |
| H 12m:62 | 18.2 |
| H 12m:64 | 24.2 |
| H 12m:100 | 2 |
| H 12m:44 | 37.5 |
| H 12m:42 | 55.3 |
| H 12m:50 | 62 |
| V 12m:28 | 5 |
| V 12m:84 | 15.5 |
| V 12m:86 | 15.5 |
| V 12m:88 | 15.5 |
| V 12m:90 | 15.5 |
| V 12m:46 | 5 |
| V 12m:76 | 8.5 |
| V 12m:78 | 8.5 |
| V 12m:30 | 11.38 |
| V 12m:34 | 11.38 |
| V 12m:62 | 8.61 |
| V 12m:64 | 8.61 |
| V 12m:100 | 18.5 |
| V 12m:44 | 4 |
| V 12m:42 | 12.97 |
| V 12m:50 | 3.25 |
| D 22,24 | 36 |
| D 84-90 | 15 |
| D 100 | 12 |

FIG. 10A

| Track-module Loading | | | | | |
|---|---|---|---|---|---|
| | Case 1 | Case 2 | Case 3 | Case 4 | Case 5 |
| Belt tension (psi) | 6,000 | 6,000 | 6,000 | 6,000 | 6,000 |
| Load FL (lb) | 19,000 | 41,000 | 63,000 | 85,000 | 88,300 |

FIG. 10B

| Load Distribution | | | | | |
|---|---|---|---|---|---|
| | Case 1 | Case 2 | Case 3 | Case 4 | Case 5 |
| F1 | 13.85% | 11.61% | 10.93% | 10.60% | 10.57% |
| F2 | 17.31% | 18.27% | 18.56% | 18.70% | 18.71% |
| F3 | 17.31% | 18.27% | 18.56% | 18.70% | 18.71% |
| F4 | 17.31% | 18.27% | 18.56% | 18.70% | 18.71% |
| F5 | 17.31% | 18.27% | 18.56% | 18.70% | 18.71% |
| F6 | 16.91% | 15.32% | 14.84% | 14.61% | 14.58% |

FIG. 10C

TRACK-MODULE APPARATUS

FIELD OF THE INVENTION

The invention relates generally to the field of track-module systems of the type typically for use in place of wheels and, more particularly, to track modules having leading and trailing wheels and a plurality of load-supporting bogie wheel between the leading and trailing wheels.

BACKGROUND OF THE INVENTION

A wide variety of both powered and unpowered load-carrying vehicles are used in agriculture, oil fields, construction and the like in which it is desirable to minimize the load per square foot on the ground on which the vehicle is moving. Typically, such vehicles are supported on the ground by large wheels with tires. However, track-module systems (or "track modules" or "track-module apparatus") may be used in place of wheels with tires to provide a much larger ground-surface engagement area supporting the weight of the vehicle and to prevent difficulties while moving over mud or other soft ground surfaces.

It is highly-desirable to distribute the load supported by the track module among all of the ground-engaging wheels of the module as evenly as possible. The loads encountered by the module are both static and dynamic and may vary considerably during operation. Loads change as the module runs over uneven ground, as the vehicle turns and as the slope of the ground being traversed changes. Ideally, all such wheels remain in contact with the ground through the endless belt and share a portion of the load at all times.

One track-module unit which is intended to distribute load relatively evenly is disclosed in U.S. Pat. No. 9,415,818 by ATI, Inc. of Mt. Vernon, IL, the owner of the present invention. Another track-module unit which is intended to distribute load relatively evenly is disclosed in U.S. Pat. No. 7,628,235 (Satzler et al.) owned by CLAAS Industrietechnik GmbH of Paderhorn, Germany. A third vehicle track-module unit is disclosed in United States Published Patent Application No. 2013/0154345 (Schultz et al.) owned by CLAAS Selbstfahrende Erntemaschinen GmbH of Harsewinkel, Germany. CLAAS also has its Lexion Terra Trac product line which includes configurations which are intended to address some of these challenges.

Each of the four track modules disclosed in these documents, although at least in part addressing some of the common challenges encountered by track modules and addressed by the present invention, none of the four prior art systems disclosed in these documents includes the particular structure of the present invention. In particular, not only is the even distribution of loading on the ground-engaging wheels a desirable characteristic of a track module, it is also desirable to minimize the the fore-and-aft movement of the bogie wheels and to provided commonality of bogie-wheel fore-and-aft movement. It is also desirable to reduce the coupling between the vertical movement of the idler wheels and the fore-and-aft movement of the bogie wheels. In addition, the shorter length of the arm which guides a bogie-wheel set provides more enhanced directional stability for the bogie-wheel sets in a track module.

All three of these desirable characteristics of bogie wheels in a track module are features of the present invention, provided by the unique structure of the kinematic linkage in the inventive track-module apparatus disclosed herein.

SUMMARY OF THE INVENTION

The present invention is a track-module apparatus which comprises: (a) idler-arm axle structure for attachment to a vehicle and having leading and trailing idler-arm axles; (b) a leading idler arm rotatably attached to the leading idler-arm axle and extending forwardly to a leading-arm distal end at which a leading ground-engaging idler wheel is rotatably attached and rearwardly to a rearward suspension end; (c) a trailing idler arm rotatably attached to the trailing idler-arm axle and extending rearwardly to a trailing-arm distal end at which a trailing ground-engaging idler wheel is rotatably attached and forwardly to a forward suspension end; (d) bogie-axle structure (i) affixed to one of the idler arms, (ii) having at least one bogie-arm axle, and (iii) positioning the at least one bogie-arm axle adjacent to and below the idler-arm axle of the idler arm to which it is affixed; (e) leading-arm and trailing-arm suspension elements rotatably attached to and extending downwardly from the rearward and forward suspension ends, respectively, and each having a lower end; (f) front and rear bogie connecting arms each rotatably attached to the bogie-axle structure and extending forwardly and rearwardly to rotatable attachments at the trailing-arm and leading-arm suspension-element lower ends, respectively; (g) front and rear ground-engaging bogie-wheel sets rotatably attached to distal ends of the front and rear bogie connecting arms, respectively; and (h) an endless track extending around the wheels.

The term "track" as used herein refers to an endless belt on which wheels of the undercarriage engage the ground. A track may be belt structure composed primarily of elastomeric material but may also be belt structure (possibly metal) assembled from a series of links.

The term "suspension elements" as used herein refers to components in the track-module apparatus which provide spring force and/or damping in the system.

The term "ground-engaging" as used herein with respect to a wheel means that the wheel bears on the ground through the endless track that engages the wheel under normal operating conditions.

The term "bogie wheel" as used herein refers to a wheel providing support for a vehicle in a middle ground-engaging region of a track module, with other ground-engaging support being provided forward and rearward of the bogie wheels.

The term "idler" as used herein refers to a wheel which is not a driven wheel but turns only by virtue of its engagement with the endless track.

In some embodiments of the inventive track-module apparatus, the idler-arm axle structure has a single attachment to the vehicle. In some of these embodiments, one or more of the following features may be present: (1) the leading and trailing idler-arm axles have a common axis; (2) the single attachment to the vehicle has a module axis, and the module and common axes coincide; (3) the bogie-axle structure has a single bogie axle; (4) each bogie connecting arm includes an offset portion between its distal end and its rotatable attachment at its corresponding suspension-element lower end; and (5) each offset portion is a downwardly-oriented portion.

In some other embodiments of the inventive track-module apparatus, the common axis is perpendicular to vehicle motion, and each bogie-wheel set includes one or more tandem pairs of bogie wheels, each pair including a bogie-pair axle on which each wheel of the pair is rotatably attached, each bogie-pair axle rotatable about a bogie-pair roll axis perpendicular to the at least one bogie-axle axis and substantially parallel to the vehicle motion. In some of these embodiments, at least one of the bogie-wheel sets includes fore and aft pairs, the bogie-pair axles of which are attached to each end of a bogie support which is rotatably attached to its corresponding bogie-connecting-arm distal end. And some embodiments further include an upper idler wheel rotatably attached to one of the idler arms, the endless track extending therearound.

In some embodiments of the inventive track-module apparatus, each bogie connecting arm includes an offset portion between its rotatable attachment and its distal end, and in some of these embodiments, each offset portion is a downwardly-oriented portion.

The bogie-axle structure in some embodiments has a single bogie axle.

In some embodiments of the inventive track-module apparatus, the leading and trailing idler-arm axles are parallel to each other and perpendicular to vehicle motion, and each bogie-wheel set includes one or more tandem pairs of bogie wheels, each pair including a bogie-pair axle on which each wheel of the pair is rotatably attached, each bogie-pair axle rotatable about a bogie-pair roll axis perpendicular to the at least one bogie-axle axis and substantially parallel to the vehicle motion. In some of these embodiments, at least one of the bogie-wheel sets includes fore and aft pairs, the bogie-pair axles of which are attached to each end of a bogie support which is rotatably attached to its corresponding bogie-connecting-arm distal end.

Some embodiments of the inventive track-module apparatus may include an upper idler wheel rotatably attached to one of the idler arms, and the endless track extends therearound.

In some embodiments of the inventive track-module apparatus, the leading-arm and trailing-arm suspension elements each include hydraulic components. In some of these embodiments, the leading-arm and trailing-arm suspension elements include a hydraulic accumulator, and in some embodiments, the leading-arm and trailing-arm suspension elements each include its own hydraulic accumulator. In some of these embodiments, the leading-arm and trailing-arm suspension elements include integral hydraulic accumulators.

In some preferred embodiments of the inventive track-module apparatus, the leading-arm and trailing-arm suspension elements are on a common hydraulic circuit, and some of these embodiments may include external accumulator hydraulically connected to the common hydraulic circuit.

The leading and trailing idler-arm axles in some embodiments have a common axis.

Some embodiments of the inventive track-module apparatus may also include track-tensioning apparatus at the distal end of one of the idler arms. In such embodiments, the tensioning apparatus includes (1) a tensioning element having first and second ends, the first end rotatably attached to the one idler arm at a proximal tensioning pivot between the distal end of the one idler arm and the idler-arm axle of the one idler arm, (2) an idler-wheel axle of the one idler arm, and (3) a wheel linkage rotatably mounted to the idler-wheel axle of the one idler arm and having first and second linkage ends, the first linkage end being rotatably mounted to the distal end of the one idler arm at a wheel-offset pivot spaced from the idler-wheel axle of the one idler arm, and the second linkage end being rotatably mounted to the second end of the tensioning element at a tensioning pivot spaced from the idler-wheel axle of the one idler arm, the tensioning and wheel-offset pivots being angularly displaced around the idler-wheel axle such that the wheel linkage is a class 2 lever with the wheel-offset pivot being the fulcrum thereof. In some of these embodiments, first linkage end and the second end of the belt-tensioning element are configured to permit rotation having at least two degrees-of-freedom to facilitate track alignment, and in some embodiments, the one idler arm is the trailing idler arm.

In some embodiments of the inventive track-module apparatus, the rotatable attachments of the leading-arm and trailing-arm suspension elements at the rearward and forward suspension ends, respectively, are configured to permit rotation having at least two degrees-of-freedom, and the rotatable attachments at the leading-arm and trailing-arm suspension-element lower ends are configured to permit rotation having at least two degrees-of-freedom.

In some embodiments, the rotatable attachments of the leading-arm and trailing-arm suspension elements at the rearward and forward suspension ends, respectively, are configured to permit rotation having at least two degrees-of-freedom, and the rotatable attachments at the leading-arm and trailing-arm suspension-element lower ends are configured to permit rotation having at least two degrees-of-freedom.

In another aspect of the present invention, the track-module apparatus includes an upper wheel and upper wheel assembly configured for attachment to the vehicle, the endless track extending therearound. In some of these embodiments, the upper wheel assembly is further configured such that the upper wheel is driven by a rotational power source for driving the track-module apparatus.

BRIEF DESCRIPTION OF THE DRAWINGS

FIG. 7A is a perspective drawing of the portion of the embodiment of FIG. 1 comprising the bogie-system components of the track-apparatus without wheels.

FIG. 7B is a perspective drawing similar to FIG. 7A but with components on two of the axes rotated with respect to their positions in FIG. 7A.

FIGS. 10A through 10C present specific numerical details of an exemplary embodiment of the inventive track-module apparatus configured as an undriven track module. FIG. 10A presents a set of kinematic linkage dimensions for this exemplary embodiment.

FIG. 10B presents a set of loading cases for the exemplary embodiment described in FIG. 10A.

FIG. 10C presents results of the kinematic analysis of the exemplary embodiment of FIG. 1 for the loading cases of FIG. 10B.

DETAILED DESCRIPTION OF PREFERRED EMBODIMENTS

FIGS. 1-7B present various views of all or portions of an embodiment 10 of the track-module apparatus (also sometimes referred to as track-module apparatus 10) of the present invention, and these eight drawings will be described in detail in the following section. Reference numbers for each component of embodiment 10 are not shown on each of FIGS. 1-7B to avoid clutter in the figures.

Figure 1:
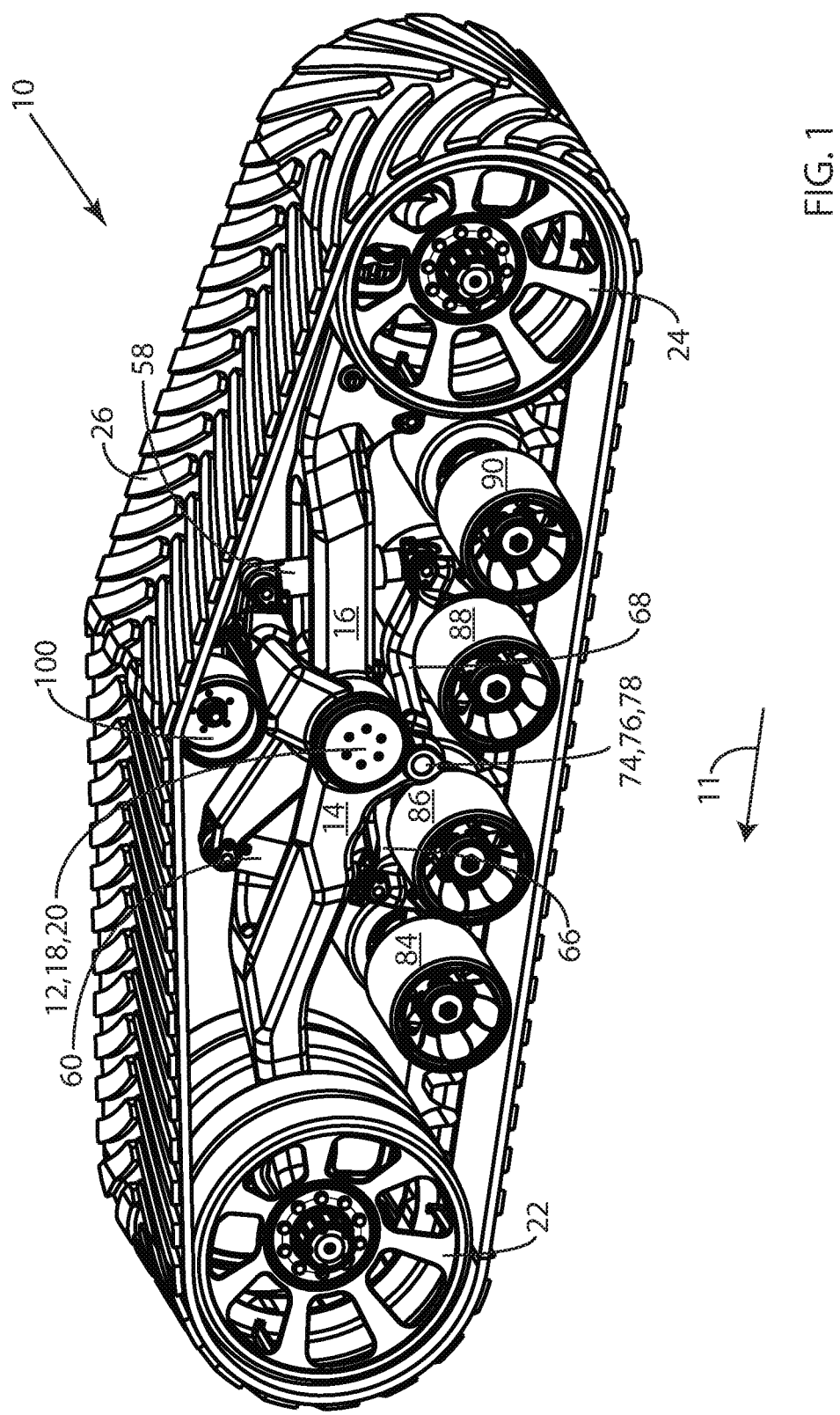
FIG. 1 is a perspective drawing of an embodiment of the track-module apparatus of this invention.
Figure 2:
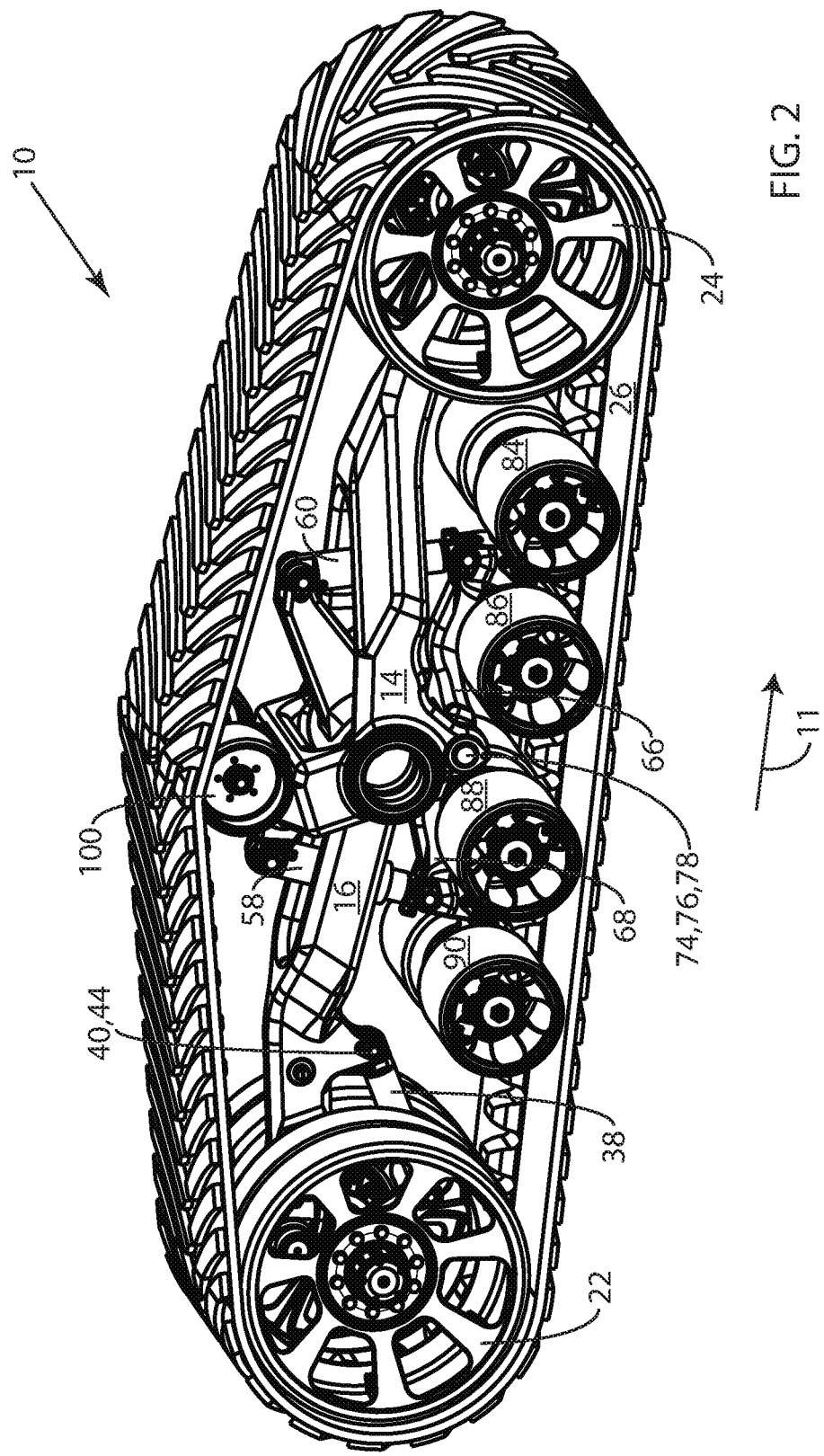
FIG. 2 is a perspective drawing of the embodiment of FIG. 1 as viewed from the side opposite that shown in FIG. 1.
Figure 3:
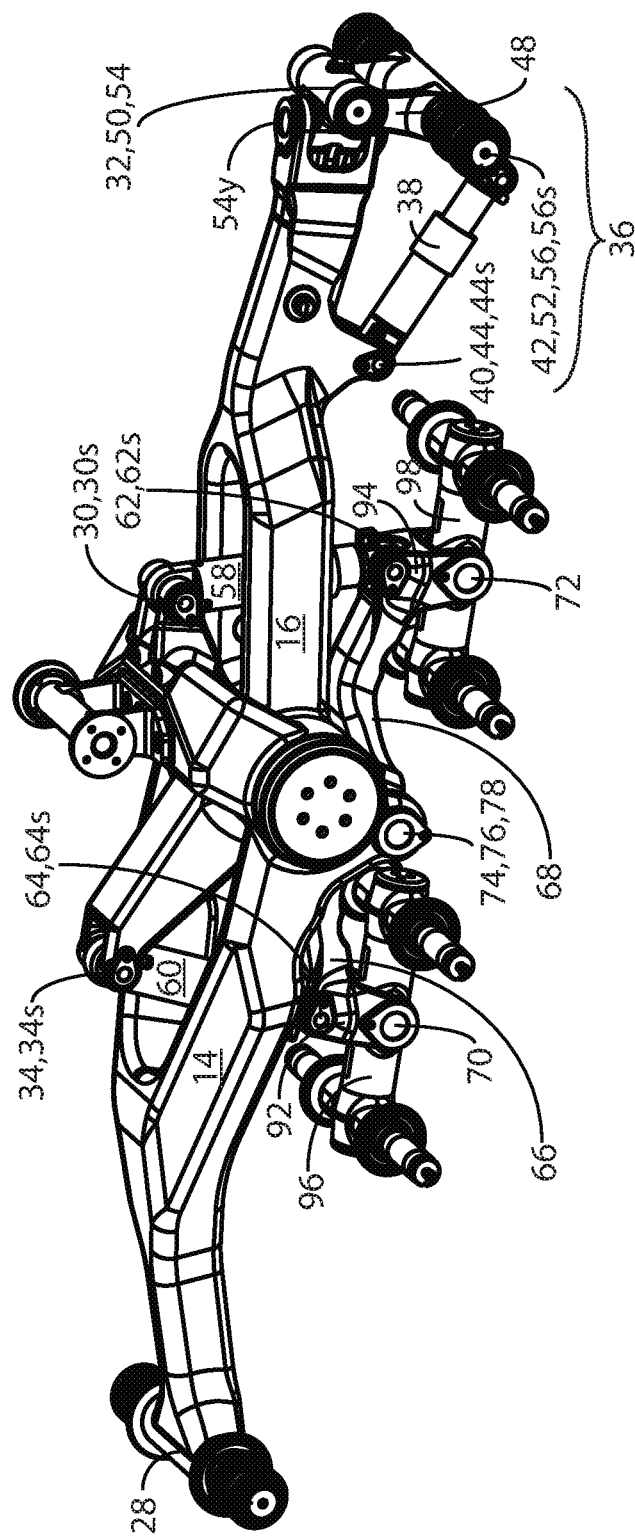
FIG. 3 is a perspective drawing of portions of the embodiment of the track-module apparatus of FIGS. 1 and 2, illustrating the track-module components without the endless track, the upper idler wheel, and wheels.

FIG. 1 is a perspective drawing of embodiment 10 of the track-module apparatus of this invention, and FIG. 2 is a perspective drawing of embodiment 10 as viewed from the side opposite (the vehicle side) that shown in FIG. 1. FIG. 3 is a perspective drawing of portions of embodiment 10 illustrating the linkage components of the inventive track-module apparatus without an endless track, ground-engaging idler and bogie wheels, and an upper idler wheel, to provide a clearer view of the structure of embodiment 10.

Figure 4:
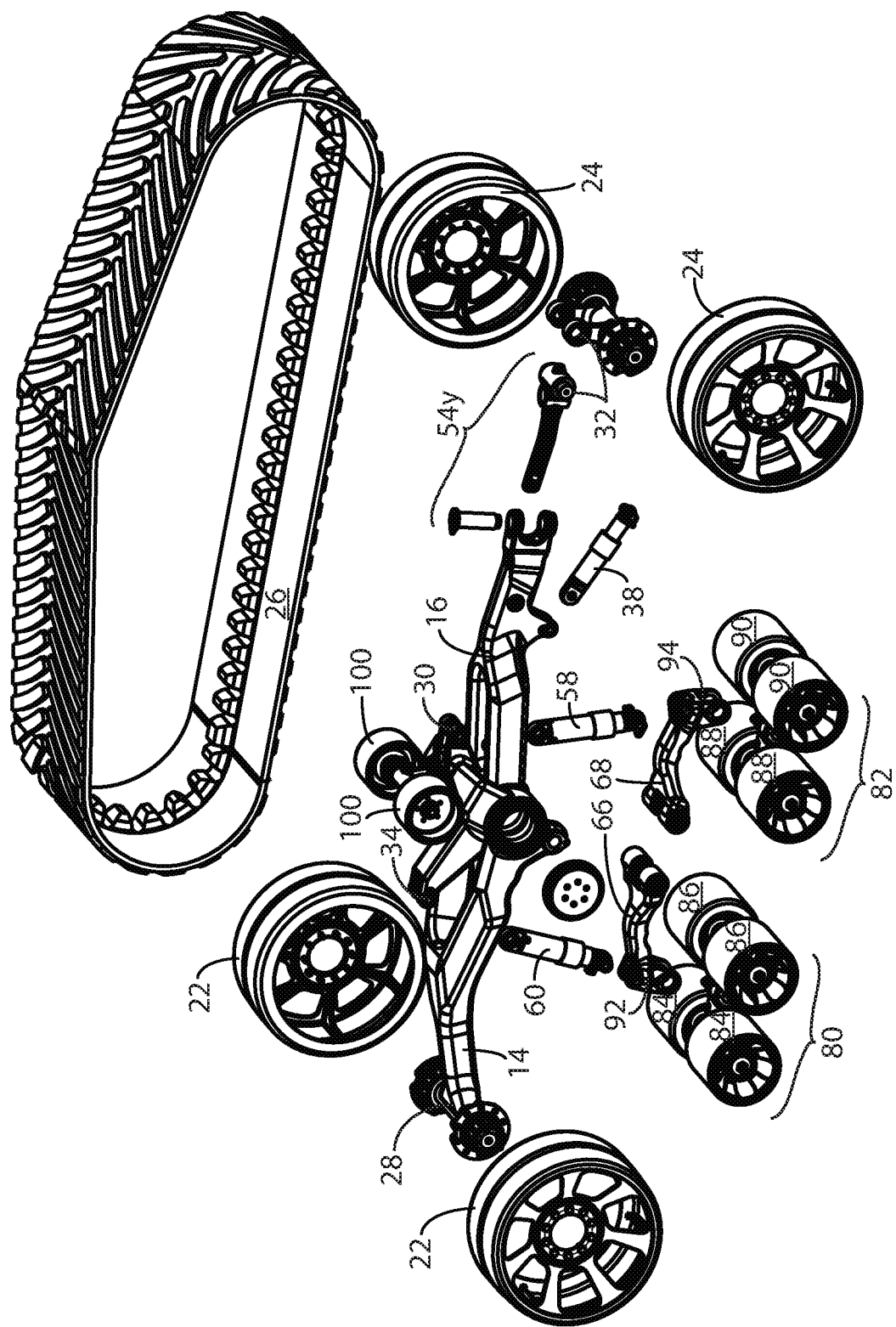
FIG. 4 is an exploded perspective drawing of the embodiment of FIGS. 1 and 2.
Figure 5:
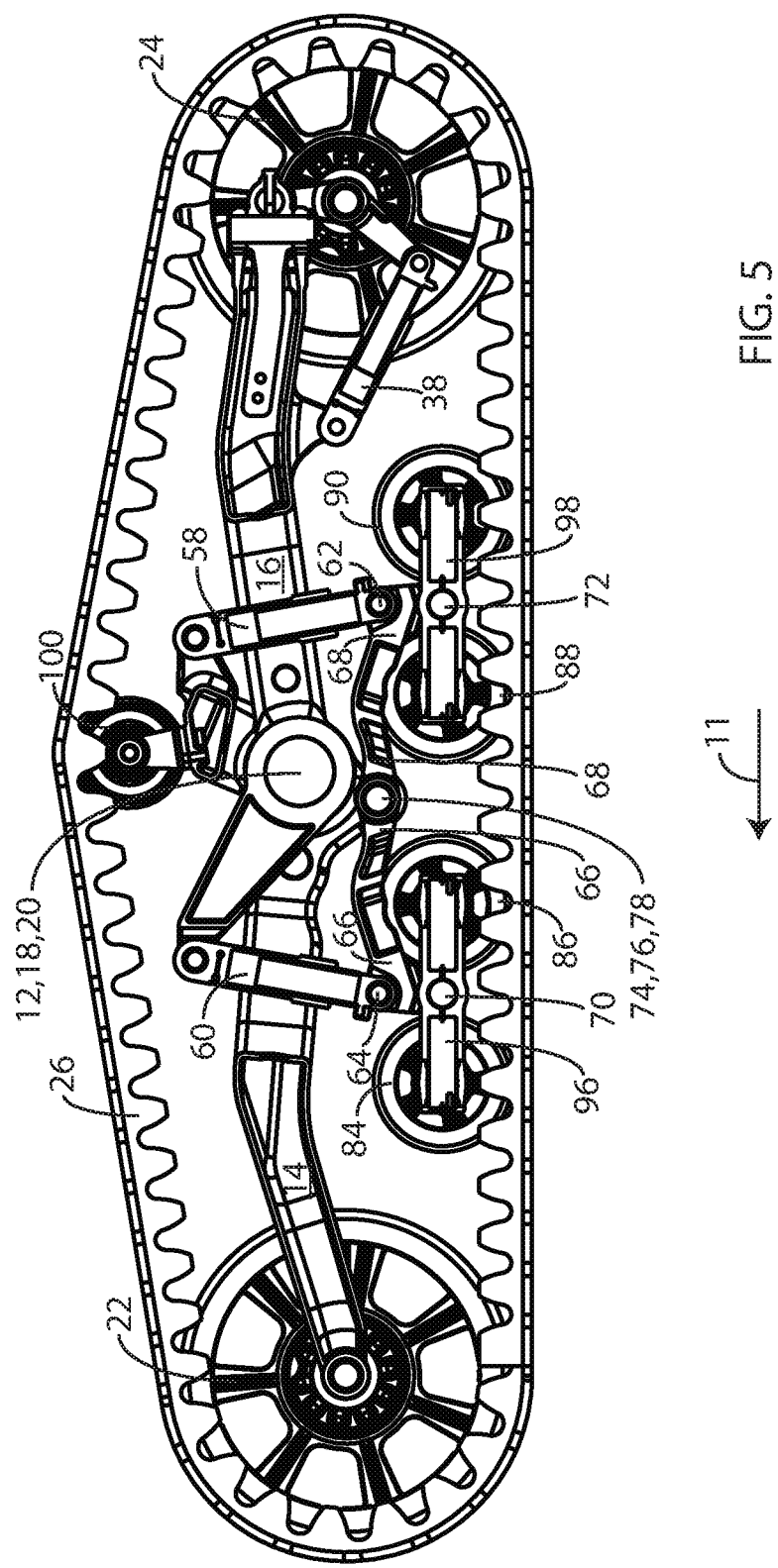
FIG. 5 is a cutaway cross-sectional drawing of the side-elevation view of the embodiment of FIGS. 1 and 2 with the near set of idler and bogie wheels removed to show the linkages.
Figure 6:
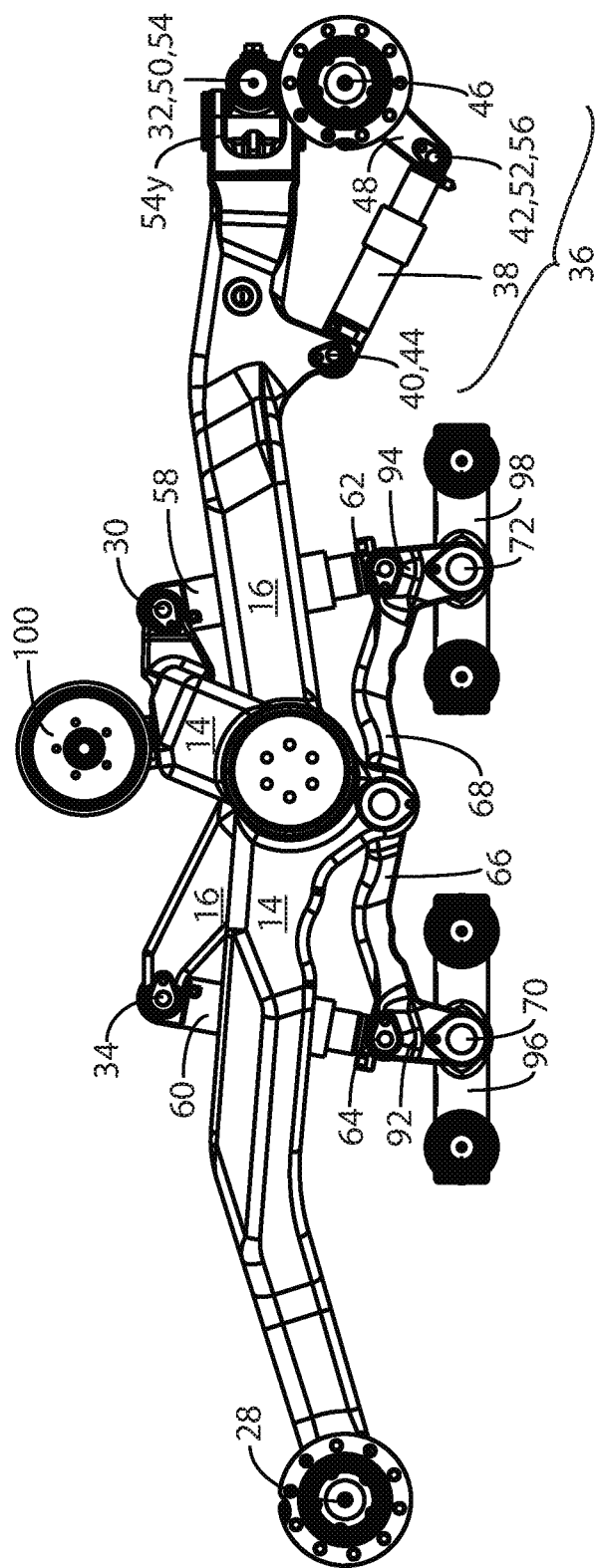
FIG. 6 is a side-elevation drawing of portions of the embodiment of the track-module apparatus of FIGS. 1 and 2, showing the track-module components without the leading and trailing idler wheels, bogie wheels, and an endless track.

FIG. 4 is an exploded perspective drawing of embodiment 10, again for the purpose of illustrating more clearly the structure of embodiment 10. FIG. 5 is a side-elevation drawing of embodiment 10 with the near set of idler and bogie wheels removed to show the linkages, and FIG. 6 is a side-elevation drawing of portions of embodiment 10 again showing the linkage components without leading and trailing idler wheels, bogie wheels, and endless track.

Finally in this group of eight drawings, FIG. 7A is a perspective drawing of the portion of embodiment 10 of FIG. 1 comprising the bogie-system components of track-module apparatus 10 without wheels, and FIG. 7B is a perspective drawing similar to FIG. 7A but with components on two of the axes rotated with respect to their positions in FIG. 7A. Please refer to one or several of the eight drawings as appropriate in the description which follows.

Referring to FIGS. 1 through 7B, inventive track-module apparatus 10 includes an idler-arm axle structure 12 for attachment to a vehicle (not shown). The direction of vehicle motion is indicated in FIGS. 1, 2, and 5 by reference number 11. Track-module apparatus 10 may be attached to the vehicle with one or more attachment points through idler-arm axle structure 12. Idler-arm structure 12 has a leading idler-arm axle 18 and a trailing idler-arm axle 20, which in embodiment 10 have a common axis 12c and thus in embodiment 10, axes 12 and 18 form a single axle 12c. Although not shown, in embodiment 10, common axis 12c is perpendicular to direction of vehicle motion 11.

Note that embodiment 10, as is normal in such track-module apparatus, has tandem pairs of idler and bogie wheels. This is seen at least in FIGS. 1, 2, and 5 and can be inferred from several other drawings. The wheels in such tandem pairs are assigned the same reference numbers in the figures.

Embodiment 10 includes a leading idler arm 14 which is rotatably attached to leading idler-arm axle 18 and extends in a forward direction to a leading-arm distal end 28 at which a leading ground-engaging idler wheel 22 is rotatably attached. Leading idler arm 14 extends in a rearward direction to a rearward suspension end 30. Embodiment 10 also includes a trailing idler arm 16 which is rotatably attached to trailing idler-arm axle 20 and extends in a rearward direction to a trailing-arm distal end 32 at which a trailing ground-engaging idler wheel 24 is rotatably attached. Trailing idler arm 16 also extends in a forward direction to a forward suspension end 34. Track-module apparatus 10 has a module axis 12m which coincides with common axis 12c. Module and common axes 12m and 12c are not shown in these figures but are best described as perpendicular to the page in FIG. 5 at the point shown as 12,18,20.

Track-module apparatus 10 also includes a bogie-axle structure 74 which is affixed to leading idler arm 14. Bogie-axle structure 74 has a bogie-arm axle 76 and positions bogie-arm axle 76 adjacent to and below idler-arm axle 18 of leading idler arm 14. Although not part of the configuration of embodiment 10, the inventive track-module apparatus may include separate front and rear bogie-arm axles 76 and 78, respectively. Also alternatively, such bogie-arm axles 76 and 78 may be attached to trailing idler arm 16 instead of leading idler arm 14 having either a common bogie-arm axle 76,78 or separate front and rear bogie-arm axles 76 and 78, respectively.

Embodiment 10 includes a leading-arm suspension element 58 and a trailing-arm suspension element 60 which are rotatably attached to and extend downwardly from rearward suspension end 30 and forward suspension end 34, respectively. Leading-arm suspension element 58 includes a leading-arm suspension-element lower end 62, and trailing-arm suspension element 60 includes a trailing-arm suspension-element lower end 64, both lower ends 62,64 most clearly seen in FIG. 5.

Track-module apparatus 10 also includes a front bogie connecting arm 66 and a rear bogie connecting arm 68 each rotatably attached to bogie-axle structure 74 at bogie-arm axle 76. Front bogie connecting arm 66 extends in a forward direction and is rotatably attached at trailing-arm suspension-element lower end 64, and rear bogie connecting arm 68 extends in a rearward direction and is rotatably attached at leading-arm suspension-element lower end 62.

Embodiment 10 includes a front ground-engaging bogie-wheel set 80 which is rotatably attached to a distal end 70 of front bogie connecting arm 66 and a rear ground-engaging bogie-wheel set 82 which is rotatably attached to a distal end 72 of rear bogie connecting arm 68. (Note that bogie-wheel sets 80 and 82 are indicated by reference numbers only in FIGS. 4 and 9 to avoid clutter.) Front bogie connecting arm 66 includes a downwardly-oriented offset portion 92 between distal end 70 and the rotatable attachment at trailing-arm suspension-element lower end 64, and rear connecting arm 68 includes a downwardly-oriented offset portion 94 between distal ends 72 and the rotatable attachment at leading-arm suspension-element lower end 62.

Front ground-engaging bogie-wheel set 80 rotates around a front bogie-wheel set pitch axis 70a, and rear ground-engaging bogie-wheel set 82 rotates around a rear bogie-wheel set pitch axis 72a. (See FIGS. 7A and 7B.)

Front bogie-wheel set 80 includes two tandem pairs of bogie wheels, front-set front pair 84 and front-set rear pair 86. (Each wheel of each pair is represented by the same reference numbers as the corresponding tandem pair.) Each of these tandem pairs includes a corresponding axle 84a and 86a to which bogie wheels 84 and 86, respectively, are rotatably attached. (See FIGS. 7A and 7B.) Bogie axles 84a and 86a are attached to each end of a bogie support 96 which is rotatably attached to bogie-connecting-arm distal end 70. Similarly, rear bogie-wheel set 82 includes two tandem pairs of bogie wheels, rear-set front pair 88 and rear-set rear pair 90. Each of these tandem pairs includes a corresponding axle 88a and 90a to which bogie wheels 88 and 90, respectively, are rotatably attached. Bogie-pair axles 88a and 90a are attached to each end of a bogie support 98 which is rotatably attached to bogie-connecting-arm distal end 72.

All four bogie-pair axles 84a, 86a, 88a, and 90a are each rotatable about a corresponding bogie-pair roll axis (84r, 86r, 88r, or 90r). Bogie-pair roll axes 84r, 86r, 88r, and 90r are each perpendicular to the axis of its corresponding bogie-axle (84a, 86a, 88a, or 90a) and substantially parallel to vehicle motion 11.

Track-module apparatus 10 includes an upper idler wheel 100 which is rotatably attached to leading idler arm 14 and also includes an endless track 26 which extends around leading 22 and trailing 24 idler wheels, bogie wheels (84, 86, 88, and 90), and upper idler wheel 100.

Embodiment 10 includes track-tensioning apparatus 36 at trailing-arm distal end 32. (See FIGS. 3, 6, and 9.) Track-tensioning apparatus 36 includes a tensioning element 38 which has a tensioning-element first end 40 rotatably attached to trailing idler arm 16 at a proximal tensioning pivot 44 which is between trailing-arm distal end 32 and trailing idler-arm axle 20. Trailing idler-wheel axle 46 is also part of track-tensioning apparatus 36, which also includes a wheel linkage 48 rotatably mounted to trailing idler-wheel axle 46. Wheel linkage 48 has a first linkage end 50 and a second linkage end 52. First linkage end 50 is rotatably mounted to trailing-arm distal end 32 at a wheel-offset pivot 54 spaced from trailing idler-wheel axle 46, and second linkage end 52 is rotatably mounted to second linkage end 42 of tensioning element 38 at a tensioning pivot 56 spaced from trailing idler-wheel axle 46. Tensioning pivot 56 and wheel-offset pivot 54 are angularly displaced around trailing idler-wheel axle 46 such that wheel linkage 48 is a class 2 lever with wheel-offset pivot 54 being the fulcrum of such class 2 lever.

In track-module apparatus 10, the rotatable attachments of leading-arm suspension element 58 at rearward suspension end 30 and trailing-arm suspension element 60 at forward suspension end 34 are configured to permit rotation having at least two degrees-of-freedom. Similarly, the rotatable attachments of leading-arm suspension-element lower end 64 and trailing-arm suspension-element lower end 62 are configured to permit rotation having at least two degrees-of-freedom. In embodiment 10, two-degree-of-freedom rotation is provided by rotatable attachments 30s, 34s, 64s, and 62s being spherical bearings shown as having the same reference numbers as the corresponding rotatable attachments. (See FIG. 3.)

In track-tensioning apparatus 36 of track-module apparatus 10, first linkage end 50 and second linkage end 52 of belt-tensioning element 38 are each also configured to permit rotation having at least two degrees-of-freedom to facilitate track alignment. Two-degree-of-freedom rotation is provided by rotatable attachments 44s and 56s being spherical bearings shown as having the same reference numbers as the corresponding rotatable attachments. In addition, wheel offset pivot 54 is configured to provide yaw pivoting adjustment with a pivot joint 54y to adjust the alignment of trailing idler wheel 24.

Figure 8:
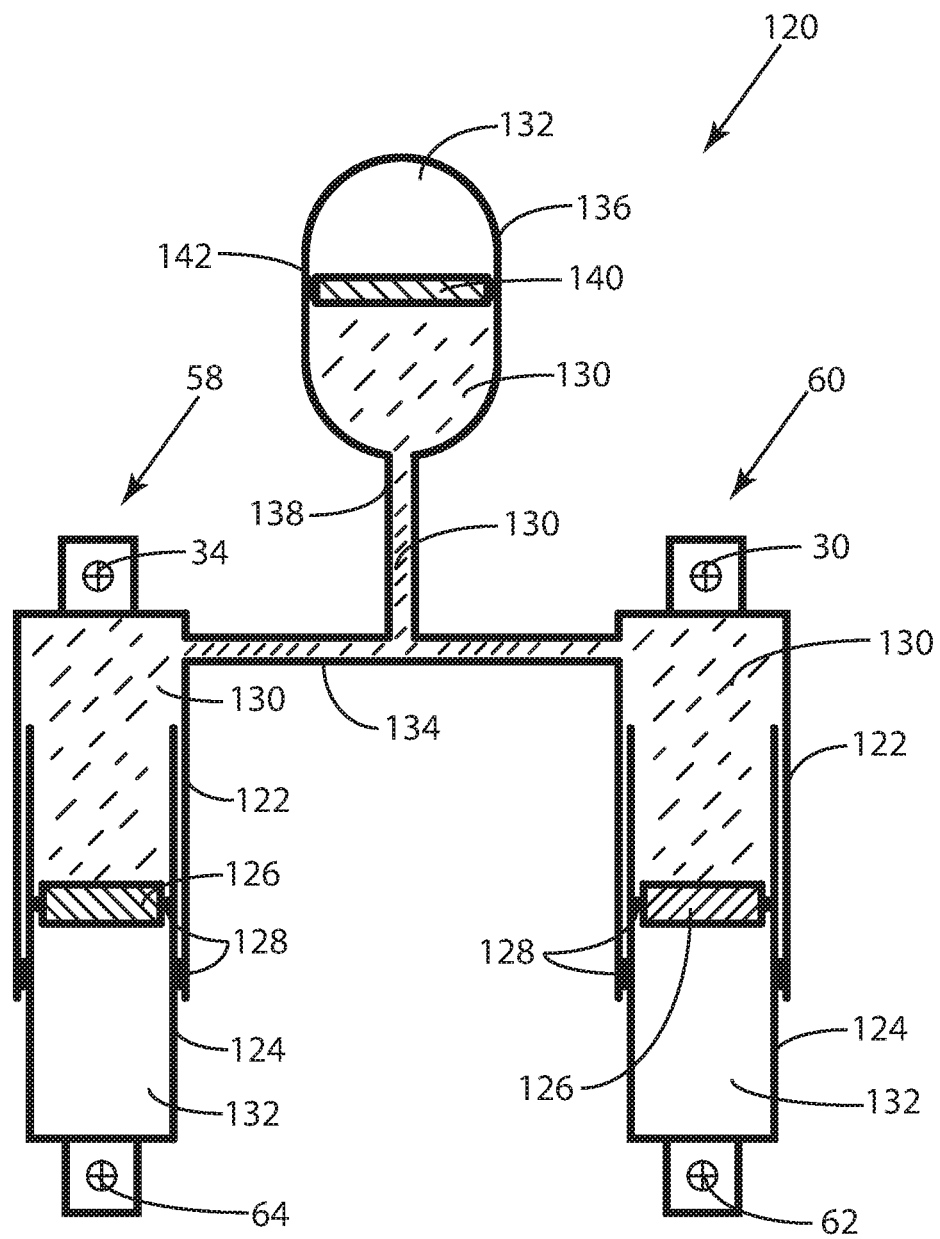
FIG. 8 is a schematic drawing of the leading-arm and trailing-arm suspension elements in a hydraulic circuit.

FIG. 8 is a schematic drawing of leading-arm suspension element 58 and trailing-arm suspension element 60 in a common hydraulic circuit 120. Suspension elements 58 and 60 each include hydraulic cylinders 122 containing hydraulic fluid 130 and gas-filled cylinders 124 containing gas 132 separated by pistons 126. Hydraulic cylinders 122 and gas-filled cylinders 124 are movably sealed for relative movement by seals 128, and gas-filled cylinders 124 and pistons 126 are movably sealed for relative movement by another set of seals 128 such that the volumes of hydraulic fluid 130 and gas 132 may both change under loads which are applied across suspension elements 58 and 60. In such components, gas 132 is typically nitrogen but other gases may be used. Gas-filled cylinders 124 serve as hydraulic accumulators but are not intended to be limiting; other types of hydraulic accumulators may be employed.

Hydraulic cylinders 122 are interconnected by a hydraulic conduit 134 which places suspension elements 58 and 60 in common hydraulic circuit 120 such that the pressures in suspension elements 58 and 60 are equal. Gas 132 in gas-filled cylinders 124 enables suspension elements 58 and 60 to provide spring forces to the suspension system of apparatus 10 while hydraulic fluid 130 flowing through hydraulic conduit 134 enables suspension elements 58 and 60 to provide damping forces to the suspension system of apparatus 10.

Hydraulic circuit 120 also includes an accumulator 136 connected to hydraulic conduit 134 by an accumulator conduit 138. Accumulator 136 includes both hydraulic fluid 130 and gas 132 in sealed separation from one another by an accumulator piston 140 movably sealed within accumulator 136 by accumulator seal 142. Gas 132 within accumulator 136 provides additional spring force to the suspension system of apparatus 10 while hydraulic fluid 130 flowing through accumulator conduit 138 and hydraulic conduit 134 provides additional damping force to suspension system of apparatus 10.

Suspension elements 58 and 60 and tensioning element 38 may provide suspension forces which are variable. For example, the damping forces may depend on the direction of the movement (extension or contraction) of the elements in order to provide a specific desired suspension performance.

The operation of the components of hydraulic circuit 120 are well-known to those skilled in mechanical systems. FIG. 8 is intended only to be schematic. For example, the functions of accumulator piston 140 and accumulator seal 142 may be provided by a membrane, a bladder or other similar component. In similar fashion, the components of suspension elements 58 and 60 may also be different from those described above while providing similar operation of suspension elements 58 and 60.

In some instances and within the scope of this invention, it may be desirable to use suspension elements which include standard hydraulic cylinders without integral hydraulic accumulators, and it may also be desirable to use hydraulic accumulators which do not employ a gas-filled component.

Figure 9:
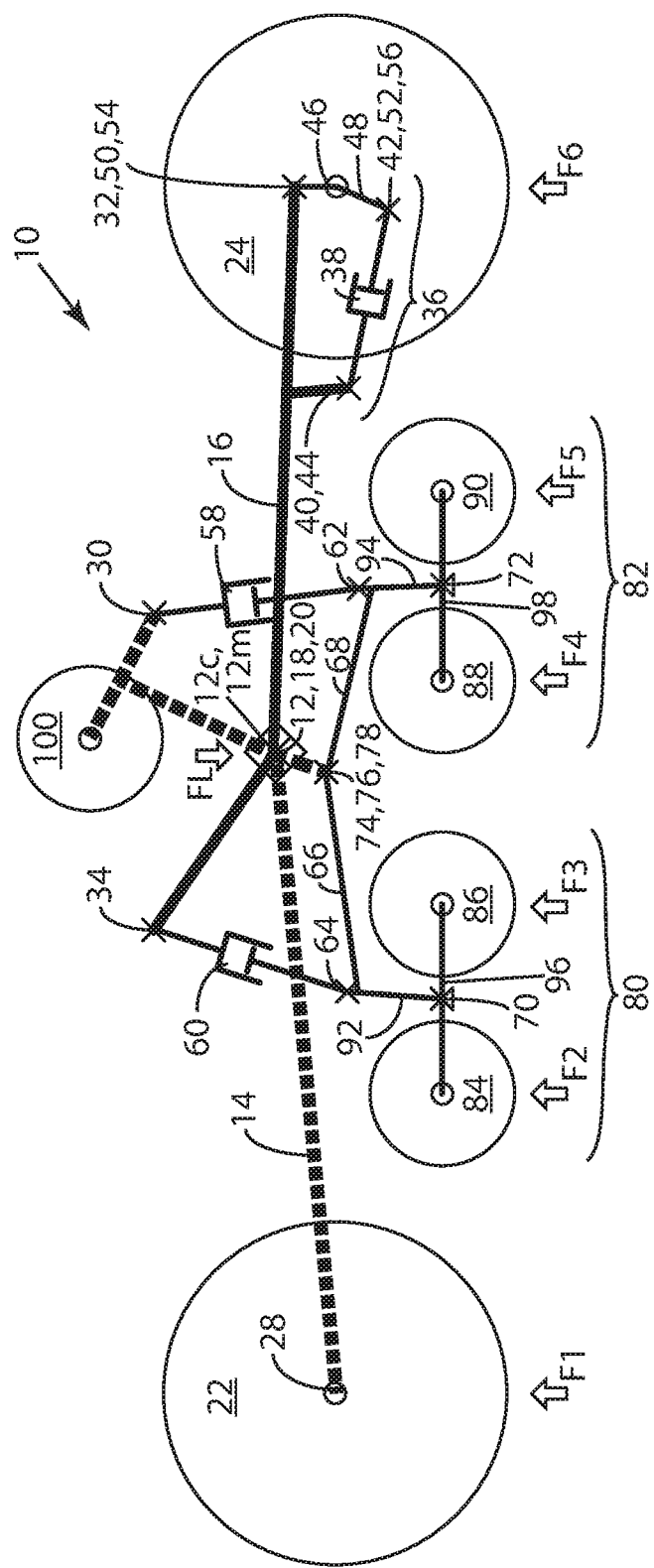
FIG. 9 is a schematic (kinematic linkage) diagram of the embodiment of the inventive track-module apparatus of FIGS. 1 and 2. Note that all rotational axes in the simplified kinematic model of FIG. 9 are perpendicular to the page.

FIG. 9 is a schematic (kinematic linkage) diagram of the embodiment of FIGS. 1 and 2, illustrating a supported load FL (shown bearing on idler-arm axle structure 12) and a set of six resulting wheel-pair loads F1 through F6. The load on leading idler wheels 22 is referred to as F1; the load on front-set fore bogie wheels 84 is referred to as F2; the load on front-set aft bogie wheels 86 is referred to as F3; the load on rear-set fore bogie wheels 88 is referred to as F4; the load on rear-set aft bogie wheels 90 is referred to as F5; and the load on trailing idler wheels 24 is referred to as F6. Since all of supported load FL acts on idler-arm axle structure 12, FIG. 9 shows FL at such location in the schematic diagram of FIG. 9.

The load FL supported by track-module apparatus 10 may have both vertical and horizontal components depending on the specific operational situation. These include at least the following: (1) the portion of the vehicle weight supported by apparatus 10; (2) braking forces which in an emergency braking situation may be quite high; and (3) the slope of the ground being traversed.

In the inventive kinematic structure of track-module apparatus 10 disclosed herein and by selecting the dimensions of the various components, a track-module designer is able to set the load distribution on the ground-engaging wheels to meet the requirements of a particular vehicle application. For example, it may be desirable to have the leading or trailing wheels take somewhat different percentages of the load on the vehicle. And often it is desirable, when the apparatus has more than one bogie-wheel axle, to have each of the bogie-wheel axles support substantially the same percentage of vehicle load. A set of linkage dimensions can be chosen to distribute the load supported by the bogies as desired.

Kinematic analysis methods well-known to those skilled in the art of mechanical systems can be used to evaluate the load-distribution performance of a specific set of linkage dimensions in track-module apparatus 10. Such analysis was used to compute the load distribution under a set of different load conditions. FIGS. 10A through 10C present specific numerical details of an exemplary embodiment of the inventive track-module apparatus configured as an undriven track module. FIG. 10A presents a set of kinematic linkage dimensions for this exemplary embodiment; FIG. 10B presents a set of loading cases for the exemplary embodiment described in FIG. 10A; and FIG. 10C presents results of the kinematic analysis of the exemplary embodiment of FIG. 10A for the loading cases of FIG. 10B.

Referring to the schematic diagram of FIG. 9 and the exemplary linkage dimensions of FIG. 10A, the dimensions are represented by the following notation. A horizontal dimension includes the letter "H" followed by two reference numbers separated by a colon. Thus, for example, H 12*m*:28 is the horizontal distance from module axis 12*m* to leading-idler arm distal end 28. The letter "V" indicates a vertical dimension, and the letter "D" a diameter.

FIG. 10C summarizes the results of analysis of the representative example of FIGS. 10A and 10B. As can be seen, in this example, the loads F2 through F5 on bogie wheels 84, 86, 88, and 90, respectively, are and remain evenly distributed among the bogie wheels, and the addition of various portions of the total loading from vehicle weight cause very modest changes to the load distribution percentages.

Figure 11A:
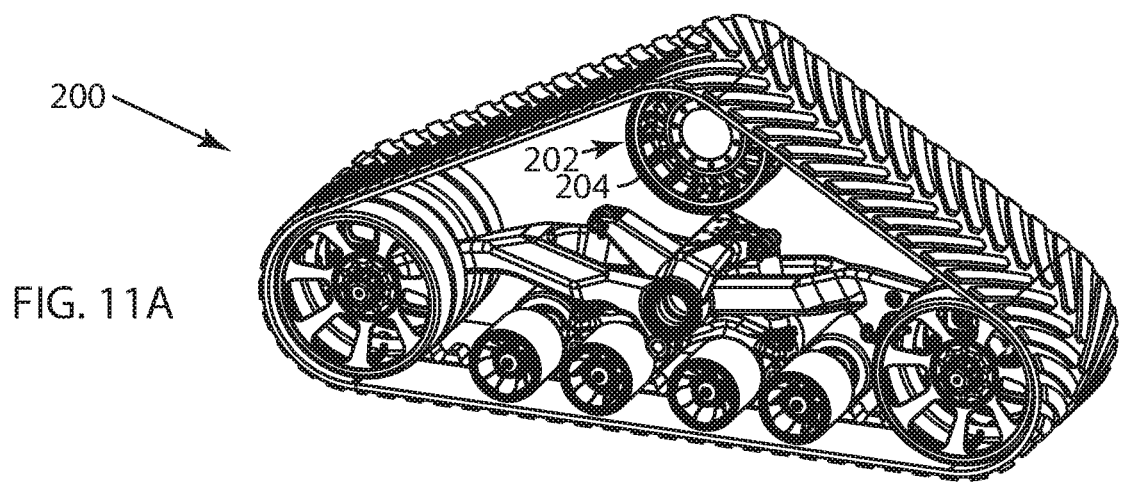
FIG. 11A is a perspective drawing of an alternative embodiment of the track-module apparatus of this invention showing an upper wheel configured to be attached to the vehicle and driven by a rotational power source for driving the track-module apparatus along the ground.
Figure 11B:
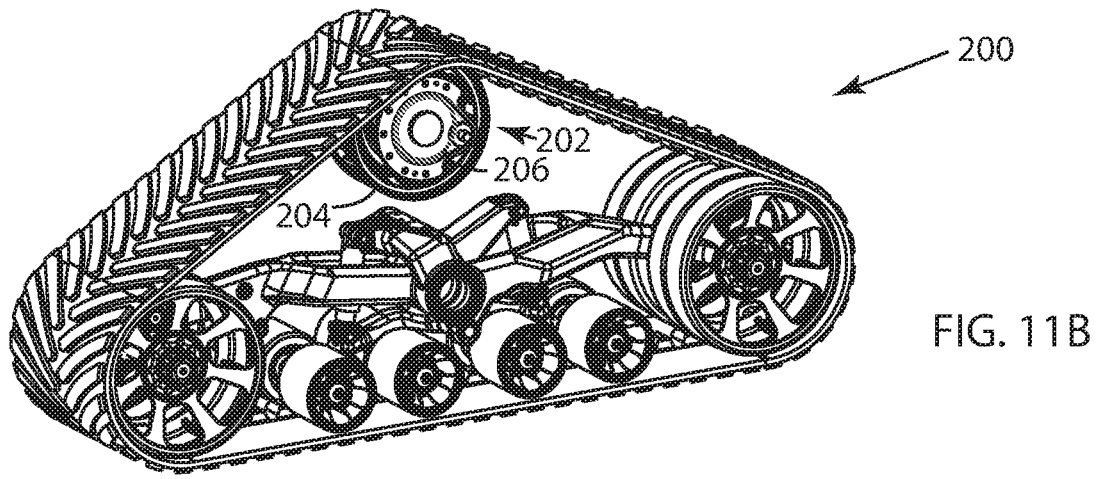
FIG. 11B is a perspective drawing of the alternative embodiment of FIG. 11A viewed from the vehicle side of the track-module apparatus, opposite to the side shown in FIG. 11A.
Figure 11C:
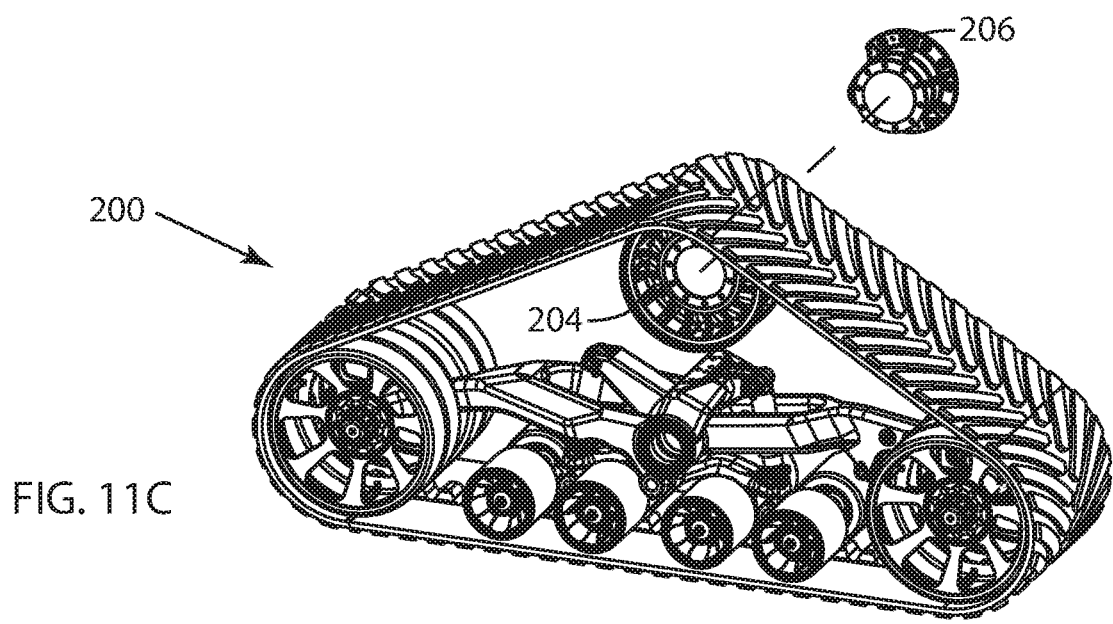
FIG. 11C is a perspective drawing of the alternative embodiment of FIG. 11A having the upper wheel assembly in exploded view.

FIGS. 11A through 11C are perspective drawings of an alternative embodiment 200 of the track-module apparatus (also designated by reference number 200) of this invention including a drive-wheel assembly 202 which includes a driven upper wheel 204 mounted on a drive-wheel mount 206. Drive-wheel mount 206 is configured to be attached to the vehicle, and driven upper wheel 204 is driven through drive-wheel mount 206 by a rotational power source (not shown) for driving track-module apparatus 200 along the ground. Endless track 26 extends around driven upper wheel 204 as well as all of the ground-engaging wheels of track-module apparatus 200.

FIG. 11B is a perspective drawing of alternative embodiment 200 viewed from the vehicle side of track-module apparatus 200, opposite to the side shown in FIG. 11A. FIG. 11C is a perspective drawing of alternative embodiment 200 showing drive-wheel assembly 202 in an exploded view.

Drive-wheel assembly 202 is driven by a rotational power source (not shown) such as an internal combustion engine, an electric motor, or a hydraulic or pneumatic motor for driving track-module apparatus 200 along the ground. Such rotational power sources are well-known to those familiar with the area of vehicle technology and need not be described further herein.

While the principles of this invention have been described in connection with specific embodiments, it should be understood clearly that these descriptions are made only by way of example and are not intended to limit the scope of the invention.

The invention claimed is:

1. Track-module apparatus comprising:
   idler-arm axle structure for attachment to a vehicle and having leading and trailing idler-arm axles;
   a leading idler arm rotatably attached to the leading idler-arm axle and extending forwardly to a leading-arm distal end at which a leading ground-engaging idler wheel is rotatably attached and rearwardly to a rearward suspension end;
   a trailing idler arm rotatably attached to the trailing idler-arm axle and extending rearwardly to a trailing-arm distal end at which a trailing ground-engaging idler wheel is rotatably attached and forwardly to a forward suspension end;
   bogie-axle structure (a) affixed to one of the idler arms, (b) having at least one bogie-arm axle, and (c) positioning the at least one bogie-arm axle adjacent to and below the idler-arm axle of the idler arm to which it is affixed;
   leading-arm and trailing-arm suspension elements rotatably attached to and extending downwardly from the rearward and forward suspension ends, respectively, and each having a lower end;
   front and rear bogie connecting arms each rotatably attached to the bogie-axle structure and extending forwardly and rearwardly to rotatable attachments at the trailing-arm and leading-arm suspension-element lower ends, respectively;
   front and rear ground-engaging bogie-wheel sets rotatably attached to distal ends of the front and rear bogie connecting arms, respectively; and
   an endless track extending around the wheels.

2. The track-module apparatus of claim 1 wherein the idler-arm axle structure has a single attachment to the vehicle.

3. The track-module apparatus of claim 2 wherein the leading and trailing idler-arm axles have a common axis.

4. The track module apparatus of claim 3 wherein the single attachment to the vehicle has a module axis, and the module and common axes coincide.

5. The track-module apparatus of claim 4 wherein the bogie-axle structure has a single bogie axle.

6. The track-module apparatus of claim 5 wherein each bogie connecting arm includes an offset portion between its distal end and its rotatable attachment at its corresponding suspension-element lower end.

7. The track-module apparatus of claim 6 wherein each offset portion is a downwardly-oriented portion.

8. The track-module apparatus of claim 7 wherein:
the common axis is perpendicular to vehicle motion; and
each bogie-wheel set includes one or more tandem pairs of bogie wheels, each pair including a bogie-pair axle on which each wheel of the pair is rotatably attached, each bogie-pair axle rotatable about a bogie-pair roll axis perpendicular to the at least one bogie-axle axis and substantially parallel to the vehicle motion.

9. The track-module apparatus of claim 8 wherein at least one of the bogie-wheel sets includes fore and aft pairs, the bogie-pair axles of which are attached to each end of a bogie support which is rotatably attached to its corresponding bogie-connecting-arm distal end.

10. The track-module apparatus of claim 9 further including an upper idler wheel rotatably attached to one of the idler arms, the endless track extending therearound.

11. The track-module apparatus of claim 1 wherein each bogie connecting arm includes an offset portion between its rotatable attachment and its distal end.

12. The track-module apparatus of claim 11 wherein each offset portion is a downwardly-oriented portion.

13. The track-module apparatus of claim 1 wherein the bogie-axle structure has a single bogie axle.

14. The track-module apparatus of claim 1 wherein:
the leading and trailing idler-arm axles are parallel to each other and perpendicular to vehicle motion; and
each bogie-wheel set includes one or more tandem pairs of bogie wheels, each pair including a bogie-pair axle on which each wheel of the pair is rotatably attached, each bogie-pair axle rotatable about a bogie-pair roll axis perpendicular to the at least one bogie-axle axis and substantially parallel to the vehicle motion.

15. The track-module apparatus of claim 14 wherein at least one of the bogie-wheel sets includes fore and aft pairs, the bogie-pair axles of which are attached to each end of a bogie support which is rotatably attached to its corresponding bogie-connecting-arm distal end.

16. The track-module apparatus of claim 1 further including an upper idler wheel rotatably attached to one of the idler arms, the endless track extending therearound.

17. The track-module apparatus of claim 1 wherein the leading-arm and trailing-arm suspension elements each include hydraulic components.

18. The track-module apparatus of claim 17 wherein the leading-arm and trailing-arm suspension elements include a hydraulic accumulator.

19. The track-module apparatus of claim 18 wherein the leading-arm and trailing-arm suspension elements each include its own hydraulic accumulator.

20. The track-module apparatus of claim 19 wherein the leading-arm and trailing-arm suspension elements include integral hydraulic accumulators.

21. The track-module apparatus of claim 17 wherein the leading-arm and trailing-arm suspension elements are on a common hydraulic circuit.

22. The track-module apparatus of claim 21 further including an external accumulator hydraulically connected to the common hydraulic circuit.

23. The track-module apparatus of claim 1 wherein the leading and trailing idler-arm axles have a common axis.

24. The track-module apparatus of claim 1 further including track-tensioning apparatus at the distal end of one of the idler arms, the tensioning apparatus including:
a tensioning element having first and second ends, the first end rotatably attached to the one idler arm at a proximal tensioning pivot between the distal end of the one idler arm and the idler-arm axle of the one idler arm;
an idler-wheel axle of the one idler arm;
a wheel linkage rotatably mounted to the idler-wheel axle of the one idler arm and having first and second linkage ends, the first linkage end being rotatably mounted to the distal end of the one idler arm at a wheel-offset pivot spaced from the idler-wheel axle of the one idler arm, and the second linkage end being rotatably mounted to the second end of the tensioning element at a tensioning pivot spaced from the idler-wheel axle of the one idler arm, the tensioning and wheel-offset pivots being angularly displaced around the idler-wheel axle such that the wheel linkage is a class 2 lever with the wheel-offset pivot being the fulcrum thereof.

25. The track-module apparatus of claim 24 wherein first linkage end and the second end of the tensioning element are configured to permit rotation having at least two degrees-of-freedom to facilitate track alignment.

26. The track-module apparatus of claim 24 wherein the one idler arm is the trailing idler arm.

27. The track-module apparatus of claim 1 wherein:
rotatable attachments of the leading-arm and trailing-arm suspension elements at the rearward and forward suspension ends, respectively, are configured to permit rotation having at least two degrees-of-freedom; and
the rotatable attachments at the leading-arm and trailing-arm suspension-element lower ends are configured to permit rotation having at least two degrees-of-freedom.

28. The track-module apparatus of claim 1 including an upper wheel and upper-wheel assembly configured for attachment to the vehicle, the endless track extending therearound.

29. The track-module apparatus of claim 28 wherein the upper wheel assembly is further configured such that the upper wheel is driven by a rotational power source for driving the track-module apparatus.

* * * * *